(12) United States Patent
Tsang

(10) Patent No.: US 8,989,335 B2
(45) Date of Patent: Mar. 24, 2015

(54) TECHNIQUES FOR ON-DEMAND PRODUCTION OF MEDICAL RADIOACTIVE IODINE ISOTOPES INCLUDING I-131

(75) Inventor: Francis Yu-Hei Tsang, Las Vegas, NV (US)

(73) Assignee: Global Medical Isotope Systems LLC, Henderson, NV (US)

( * ) Notice: Subject to any disclaimer, the term of this patent is extended or adjusted under 35 U.S.C. 154(b) by 965 days.

(21) Appl. No.: 12/944,694

(22) Filed: Nov. 11, 2010

(65) Prior Publication Data

US 2011/0286565 A1    Nov. 24, 2011

Related U.S. Application Data

(60) Provisional application No. 61/260,585, filed on Nov. 12, 2009, provisional application No. 61/265,383, filed on Dec. 1, 2009, provisional application No. 61/405,605, filed on Oct. 21, 2010.

(51) Int. Cl.
| | | |
|---|---|---|
| G21G 1/06 | (2006.01) | |
| G21G 1/08 | (2006.01) | |
| G21G 1/00 | (2006.01) | |

(52) U.S. Cl.
CPC .......... *G21G 1/08* (2013.01); *G21G 2001/0036* (2013.01); *G21G 2001/0042* (2013.01); *G21G 2001/0063* (2013.01)
USPC ............ 376/169; 376/156; 376/159; 376/168

(58) Field of Classification Search
CPC .......... G21G 1/00; G21G 1/001; G21G 1/04; G21G 1/06; G21G 4/00; G21G 4/02; G21G 2001/0036; G21G 2001/001; G21G 2001/0042; G21G 2001/0063
USPC ......................................... 376/156, 158, 189
See application file for complete search history.

(56) References Cited

U.S. PATENT DOCUMENTS

| | | | |
|---|---|---|---|
| 3,267,001 A | | 8/1966 | Greebler |
| 3,680,284 A | * | 8/1972 | Schmeling ...................... 96/146 |
| 4,088,737 A | * | 5/1978 | Thomas et al. ................. 588/14 |
| 4,123,498 A | * | 10/1978 | Rosenbaum et al. ............. 423/2 |
| 4,275,045 A | | 6/1981 | Anav et al. |
| 4,344,913 A | | 8/1982 | Marwick |
| 4,370,298 A | | 1/1983 | Marwick et al. |

(Continued)

OTHER PUBLICATIONS

International Search Report and Written Opinion for PCT Patent Application No. PCT/US2010/56573 mailed on Oct. 21, 2011, 16 pages.

(Continued)

*Primary Examiner* — Jack W Keith
*Assistant Examiner* — Marshall O'Connor
(74) *Attorney, Agent, or Firm* — Connie R Masters

(57) ABSTRACT

A system for radioisotope production uses fast-neutron-caused fission of depleted or naturally occurring uranium targets in an irradiation chamber. Fast fission can be enhanced by having neutrons encountering the target undergo scattering or reflection to increase each neutron's probability of causing fission (n, f) reactions in U-238. The U-238 can be deployed as one or more layers sandwiched between layers of neutron-reflecting material, or as rods surrounded by neutron-reflecting material. The gaseous fission products can be withdrawn from the irradiation chamber on a continuous basis, and the radioactive iodine isotopes (including I-131) extracted.

15 Claims, 6 Drawing Sheets

(56) References Cited

U.S. PATENT DOCUMENTS

| | | | |
|---|---|---|---|
| 4,626,400 | A | 12/1986 | Jassby et al. |
| 4,788,082 | A * | 11/1988 | Schmitt ..................... 427/248.1 |
| 4,859,406 | A | 8/1989 | Hannerz |
| 5,888,397 | A | 3/1999 | Rogers et al. |
| 6,577,697 | B2 * | 6/2003 | Pearcy et al. ................. 376/159 |
| 2008/0112527 | A1 | 5/2008 | Winterberg |
| 2009/0268860 | A1 | 10/2009 | Lu |
| 2009/0274258 | A1 | 11/2009 | Holden et al. |

OTHER PUBLICATIONS

Burger, L.L., et al., "HWVP Iodine Trap Evaluation", Pacific Northwest National Laboratory, U.S. Department of Energy, Report PNNL-14860, Sep. 2004, 45 pages.

Chapman, K., et al. "Radioactive Iodine Capture in Silver-Containing Mordenites through Nanoscale Silver Iodide Formation", J. Am. Chem. Soc., 2010, vol. 132, No. 26, pp. 8897-8899.

International Atomic Energy Agency (IAEA), "Manual for Reactor Produced Radioisotopes", IAEA-TECDOC-1340, Vienna, Austria, Jan. 2003, 258 pages.

National Research Council (NRC), "Medical Isotope Production Without Highly Enriched Uranium, Chapter 2—Molybdenum-99/Technetium-99m Production and Use", National Academies Press, Washington, D.C., 2009, 16 pages.

Pemberton, W., et al., "Solubility and Electrochemistry of Uranyl Carbonate in a Room Temperature Ionic Liquid System", 42nd Western Regional Meeting of the American Chemical Society, Las Vegas, NV, Sep. 23-27, 2008, 1 page.

Rupp, A.F., et al. "The Early Days of the Radioisotope Production Program", Isotopes and Radiation Technology, Fall 1966, vol. 4, No. 1, pp. 33-40.

Rupp, A.F., et al., "Production of Fission Product Iodine 131", Oak Ridge National Laboratory, U.S. Atomic Energy Commission, ORNL-1047, Oak Ridge, Tennessee, Dec. 18, 1951, 25 pages. [Retrieved on Oct. 9, 2011 from the internet at http://www.ornl.gov/info/reports/1951/3445603527565.pdf.].

Wang, Wei-Hsung et al., "Simulating Gaseous $^{131}$I Distribution in a Silver Zeolite Cartridge Using Sodium Iodide Solution", Health Physics, May 2006, vol. 90, Issue 5, pp. S73-S79.

* cited by examiner

Cross-Section of Circle or Cylinder

TECHNIQUES FOR ON-DEMAND PRODUCTION OF MEDICAL RADIOACTIVE IODINE ISOTOPES INCLUDING I-131

CROSS-REFERENCES TO RELATED APPLICATIONS

This application claims priority to the following U.S. patent applications:

U.S. Provisional Patent Application No. 61/260,585 filed Nov. 12, 2009 for "Medical Isotope Production on Demand";

U.S. Provisional Patent Application No. 61/265,383 filed Dec. 1, 2009 for "System for On-Demand Production of I-131";

U.S. Provisional Patent Application No. 61/405,605 filed Oct. 21, 2010 for "Techniques for On-Demand Production of Medical Isotopes Such as Mo-99/Tc-99m."

This application is also related to U.S. patent application Ser. No. 12/944,634 filed contemporaneously herewith for "Techniques for On-Demand Production of Medical Isotopes Such As Mo-99/Tc-99m and Radioactive Iodine Isotopes Including I-131" (inventor Francis Yu-Hei Tsang).

The entire disclosures of all the above mentioned applications, including all appendices and attachments, are hereby incorporated by reference for all purposes.

BACKGROUND OF THE INVENTION

The present invention relates generally to the generation of unstable, i.e., radioactive, nuclear isotopes (often referred to as radioisotopes), and more particularly to techniques for generating medical isotopes such as molybdenum-99 (Mo-99) and its decay daughter technetium-99m (Tc-99m), and radioactive iodine such as iodine-131 (I-131).

Radioisotopes, in very small doses, are widely used in clinical therapy (radiation treatments) for such diseases as cancer and hyperthyroidism, as well as diagnostics using the ability to image regions where radioisotopes concentrate in the subject's body. Currently, nearly 80% of all nuclear imaging procedures utilize Tc-99m, making it a very important isotope for diagnostic medicine. Molecules and proteins that concentrate in specific areas of the body can be tagged with Tc-99m, which decays to a ground state through emission of a low energy gamma-ray, and observed from outside the body using gamma-ray cameras or detectors. This method allows "active" areas, or regions where the Tc-99m tagged compound concentrates, to be observed in 3-D from outside the body.

With a high demand for medical procedures involving the use of Tc-99m and radioactive iodine such as I-131, a demand that is only expected to increase as the U.S. population ages, reliability of the Tc-99m and I-131 supplies is critical. A major obstacle to a reliable source is the fact that 100% of the U.S. supply is imported from foreign reactors. The U.S supply is sourced almost entirely from the NRU Reactor in Canada (Chalk River) and the HFR in the Netherlands, and both reactors are over 40 years old. The rapid decay of the Mo-99 means that product must be shipped and used immediately with no long term storage possible. Any interruptions in supply, even brief periods such as a reactor shutting down for maintenance, can cause shortages and patient treatment delays. Real shortages have occurred as recently as 2007 and 2008 when the NRU Reactor and HFR, respectively, were shut down for a period of time.

The thyroid is a gland in the neck that produces two hormones that regulate all aspects of the body's metabolism, the chemical process of converting food into energy. When a thyroid gland is overactive, it produces too much of these thyroid hormones, accelerating the metabolism. The condition is called hyperthyroidism, and can be caused by Graves' disease, which causes the entire thyroid to be overactive, or by nodules within the thyroid which are locally overactive.

Radioactive iodine I-131 (sometimes referred to as $^{131}$I or radioiodine I-131) is another important radioisotope. It has a half-life of 8.02 days and used for a variety of applications. These include diagnostic and therapeutic thyroid applications (in either a solution or capsule form), industrial tracers, and various research applications such as antibody labeling. I-131 is also used to label antibodies for therapeutic applications in the treatment of cancers.

Traditional methods rely on thermal fission of targets made of highly enriched uranium (HEU). HEU is uranium that has been processed to greatly increase the percentage of fissionable U-235 above the approximately 0.7% level, found in naturally occurring uranium, to levels above 93%. Thermal fission refers to the irradiation of a target by low-energy ("thermal") neutrons, causing fission to occur. Currently, the U.S. exports more than 50 kg of HEU having more than 93% U-235 to at least five foreign nuclear reactors for irradiation and extraction of the Mo-99/Tc-99m and other medical isotopes. The proliferation potential and hazards associated with shipping fresh HEU and spent HEU are obvious, but current production of Mo-99/Tc-99m relies on this process.

The spent HEU target material is also a threat because only between 1-3% of the U-235 in the HEU target is burned up and the remaining target material can still contain 92% enriched U-235. Also, because of the low burn-up, after three-year storage, the HEU target materials can be essentially contact handled, meaning that due to its relatively low burn up, the amount of long-lived fission products in the spent HEU target material are minimal. The spent HEU target can be handled and processed relatively easy with minimal shielding materials to protect the proliferators.

Alternative techniques have been proposed, but they are thought to be significantly less cost effective and many technical challenges remain. One such proposal is to transition to a lower level of enrichment of the U-235 target (LEU), say below 20% U-235, but this still presents the same problems as HEU, including the need for a nuclear reactor. Another method proposed is to utilize neutron capture in Mo-98, which can be mined as ore. However, natural molybdenum contains on the order of 24.1% Mo-98, so targets are likely to require enrichment prior to irradiation.

Other techniques proposed for production of Mo-99 include causing (p, 2n) or (p, pn) reactions in an Mo-100 target using a proton accelerator (cyclotron). Again, natural molybdenum contains on the order of 9.64% of Mo-100, so targets for cyclotrons are also likely to require enrichment prior to irradiation. It has also been proposed to cause ($\gamma$, f) reactions on U-235 or LEU, or U-238 or a combination of all three materials via bremsstrahlung radiation produced from a high-energy electron accelerator.

The proposed alternative methods using particle accelerators all have similar problems:

They all require large and enriched isotopic targets.

They all require heat removal from the targets during irradiation, which represents a technical challenge.

The Mo-99 produced must be purified to remove unused molybdenum isotopes and other fission products and activation by-products.

They all require development of fast dissolution methods for the metallic targets.

Treatment and disposal of the waste fission products and waste uranium present significant challenges (for LEU).

SUMMARY OF THE INVENTION

Embodiments of the present invention provide techniques for the production of radioactive iodine isotopes. Radioisotopes that are useful in the field of medicine are sometimes referred to as medical isotopes, although some stable isotopes have potential medical uses and are sometimes referred to as stable medical isotopes. The techniques provided by the invention overcome at least some of the problems discussed above. Embodiments do not rely on a nuclear reactor far from the delivery site, but can be implemented as relatively small stand-alone devices that can be widely distributed.

In describing embodiments of the invention, the following terms are sometimes used:

Non-enriched uranium ("NEU");
Neutron-reflecting material;
Fast neutrons;
Fast neutron fission reactions; and
Neutron generator.

As will now be discussed, these terms are defined broadly.

The term "non-enriched uranium" ("NEU") is intended to cover naturally occurring uranium or depleted uranium, in addition to any uranium that contains at least as much U-238 as naturally occurring uranium (99.27%) and no more U-235 than naturally occurring uranium (0.72%). Depleted uranium is normally understood to mean uranium that has less than the naturally occurring amount of U-235 (0.72%), but depleted uranium that is used for commercial and military purposes more commonly has less than 0.3% U-235.

The definition of NEU is not limited to any form of the uranium, so long as the isotope content meets the above criteria. The NEU material, also referred to as the NEU feedstock or the NEU target, can be in the form of bulk solid material, crushed solid material, metallic shavings, metallic filings, sintered pellets, liquid solutions, molten salts, molten alloys, or slurries. The NEU, whatever its form, can also be mixed with other material that is compatible with the intended use.

The term "neutron-reflecting material" is intended to cover material that reflects or scatters neutrons. While it is preferred that the scattering be elastic, or largely so, this is not necessary for the definition. Further, while some of the embodiments use neutron-reflecting material formed into solid structural shapes such as plates, spherical shells, cylindrical shells, tubes, and the like, the term is intended to cover material that includes small particles such as powders, pellets, shavings, filings, and the like.

The term "fast neutron" is often used to distinguish thermal neutrons, which Wikipedia characterizes as having energies of "of about 0.025 eV." Wikipedia also characterizes fast neutrons as having energies "greater than 1 eV, 0.1 MeV or approximately 1 MeV, depending on the definition." For present purposes, the term "fast neutron" will mean a neutron with an energy above 800 keV (i.e., 0.8 MeV), which is a threshold for fission in U-238. However, embodiments of the present invention can use neutrons of higher energies, say 10-20 MeV, or possibly 12-16 MeV. Higher-energy neutrons, say in the 20-100 MeV range, can also be used.

The term "fast neutron fission" is intended to cover the fission reactions that are caused by neutrons with energies that are above the threshold of 800 keV. The reaction representation (n, f) is used for simplicity.

The term "neutron generator" is intended to cover a wide range of devices and processes for generating neutrons of the desired energies. Wikipedia defines neutron generators as follows:

Neutron generators are neutron source devices which contain compact linear accelerators and that produce neutrons by fusing isotopes of hydrogen together. The fusion reactions take place in these devices by accelerating either deuterium, tritium, or a mixture of these two isotopes into a metal hydride target which also contains either deuterium, tritium or a mixture. Fusion of deuterium atoms (D+D) results in the formation of a He-3 ion and a neutron with a kinetic energy of approximately 2.45 MeV. Fusion of a deuterium and a tritium atom (D+T) results in the formation of a He-4 ion and a neutron with a kinetic energy of approximately 14.1 MeV.

Fusion of a triton and a tritium atom (T+T) results in the formation of a He-4 ion and two neutrons. These two neutrons can have an energy range from below 0.1 eV to ~9.33 MeV.

As used in this application, however, the term "neutron generator" is defined more broadly to include any device that would provide a sufficient number of neutrons of the desired energies. This could include, for example, but is not limited to, the following.

A dense plasma focusing device can use deuterium or tritium plasma to produce 2.45 MeV neutrons, 14.1 MeV neutrons, or neutrons covering a broad spectrum (below 0.1 eV to ~9.33 MeV).

An electron accelerator can be used to send high energy electrons from an electron beam onto a converter material, e.g., tantalum (Ta), tungsten (W), etc., thereby converting the electron energy into bremsstrahlung radiation. This bremsstrahlung radiation can then be used to interact with neutron-rich materials to produce neutrons via ($\gamma$, n) interactions. For example, irradiating the beryllium isotope Be-9 with $\gamma$ rays can produce a beryllium isotope with a lower atomic mass and one or two neutrons (the reactions being denoted Be-9($\gamma$, n)Be-8, or Be-9($\gamma$, 2n)Be-7).

A proton accelerator such as a cyclotron can be used to send high energy protons into materials such as carbon, beryllium, or lithium, for example, to produce neutrons via C-12(p, n)N-12, or Be-9(p, n)B-9 reactions, for example.

In short, embodiments of the present invention use fast-neutron-caused fission of depleted or naturally occurring uranium targets in an irradiation chamber. A generic term for such uranium is non-enriched uranium ("NEU"). U-238, is fissionable in that it can be made to fission when struck by fast neutrons, i.e., neutrons having energies above a fission threshold. It is not fissile in that it cannot sustain a chain reaction. This is because when U-238 undergoes fission, neutrons resulting from the fission are generally below the energy threshold to cause more U-238 fission.

The purpose of causing fission is to generate and extract fission products that are, or decay to, desired radioisotopes. Embodiments will be described in the context of extracting radioactive iodine isotopes, but this is exemplary. Since the fission products include Mo-99/Tc-99m, some embodiments can also extract Mo-99/Tc-99m as well.

In this application, the term "fission product" will be used as set forth in the NRC glossary (http://www.nrc.gov/reading-rm/basic-ref/glossary.html), which defines "fission products" as "[t]he nuclei (fission fragments) formed by the fission of heavy elements, plus the nuclide formed by the fission fragments' radioactive decay." Thus the term is used more broadly than a definition that would cover only the nuclei resulting directly from the fission reaction.

This interpretation is consistent with the glossary at http://www.nuclearglossary.com ("The Language of the Nucleus"), which defines "fission product" as "[a]residual nucleus formed in fission, including fission fragments and their decay daughters." The term "fission fragment" is defined as "[a] nucleus formed as a direct result of fission. Fission products formed by the decay of these nuclides are not included." The term "primary fission product" is said to be a synonym for "fission fragment."

In an aspect of the invention, a method for producing radioactive iodine comprises introducing uranium into an irradiation chamber, the irradiation chamber having a gas inlet and a gas outlet; irradiating the uranium material with neutrons to cause fission reactions to occur in the uranium material, wherein at least some of the fission reactions lead to the production of radioactive iodine, and at least some of the radioactive iodine sublimates in the irradiation chamber; introducing a carrier gas into the gas inlet to mix with the sublimated radioactive iodine and form a gas mixture; withdrawing the gas mixture from the gas outlet; and separating at least some of the radioactive iodine from other components of the gas mixture.

In some embodiments, the method further includes allowing a period of time to elapse so that at least one short-lived radioactive iodine isotope substantially decays to a non-iodine substance; and separating the non-iodine substance from the remaining radioactive iodine.

In some embodiments, the uranium material is non-enriched uranium material (NEU). In some embodiments, the neutrons are provided at an energy above a fast fission threshold for U-238. In some embodiments, at least a portion of the gas mixture is returned to the gas inlet after separation of the radioactive iodine. In some embodiments, separating at least some of the radioactive iodine includes using a silver zeolite trap.

In some embodiments, the uranium material is removed from the irradiation chamber after an irradiation period, the uranium material is dissolved in a solvent, thereby releasing additional sublimated iodine as part of an additional gas mixture, and at least some of the additional radioactive iodine is separated from other components of the additional gas mixture.

In another aspect of the invention, a method for producing radioactive iodine comprises providing a volume of non-enriched uranium ("NEU") material in an irradiation chamber, the irradiation chamber having a gas inlet and a gas outlet; providing one or more neutron-reflecting regions disposed in or around the irradiation chamber; irradiating the uranium material with neutrons to cause fission reactions to occur in the uranium material, wherein the neutrons are provided at an energy above a fast fission threshold for U 238, the one or more neutron-reflecting regions are configured to increase the path length traveled by at least some of the neutrons before those neutrons leave the irradiation chamber, at least some of the fission reactions lead to the production of radioactive iodine, and at least some of the radioactive iodine sublimates in the irradiation chamber. The method also comprises, during irradiation, introducing a carrier gas into the gas inlet to mix with the sublimated radioactive iodine and form a gas mixture; withdrawing the gas mixture from the gas outlet; and separating at least some of the radioactive iodine from other components of the gas mixture.

In some embodiments, at least a portion of the gas mixture is returned to the gas inlet after separation of the radioactive iodine. In some embodiments, separating at least some of the radioactive iodine includes using a silver zeolite trap. In some embodiments, the method further includes, after an irradiation period, removing the NEU material from the irradiation chamber; dissolving the NEU material in a solvent, thereby releasing additional sublimated iodine as part of an additional gas mixture; and separating at least some of the additional radioactive iodine from other components of the additional gas mixture.

In another aspect of the invention, apparatus for producing radioactive iodine isotopes comprises a neutron generator; an irradiation chamber that provides a number of regions configured to receive uranium material for irradiation by neutrons generated by the neutron generator, and the irradiation chamber includes a gas inlet and a gas outlet. During irradiation, fission reactions occur in the uranium material, at least some of the fission reactions lead to the production of radioactive iodine, and at least some of the radioactive iodine sublimates in the irradiation chamber. The gas inlet is configured to allow a carrier gas to be introduced into the gas inlet to mix with the sublimated radioactive iodine and form a gas mixture, and the gas outlet is configured to allow withdrawing the gas mixture from the gas outlet. The apparatus also includes a mechanism for separating at least some of the radioactive iodine from other components of the gas mixture.

In some embodiments, the uranium material is non-enriched uranium material, and the neutrons are provided at an energy above a fast fission threshold for U-238. In some embodiments, one or more neutron-reflecting regions are disposed in or around the irradiation chamber, with the one or more neutron-reflecting regions being configured to increase the path length traveled by at least some of the neutrons before those neutrons leave the irradiation chamber. The one or more neutron-reflecting regions may form one or more walls of the irradiation chamber formed of neutron-reflecting material.

In another aspect of the invention, apparatus for producing radioactive iodine isotopes comprises a neutron generator; an irradiation chamber, the irradiation chamber providing a number of regions configured to receive uranium material for irradiation by neutrons generated by the neutron generator, the irradiation chamber having a gas inlet and a gas outlet. During irradiation, fission reactions occur in the uranium material, at least some of the fission reactions lead to the production of radioactive iodine, and at least some of the radioactive iodine sublimates in the irradiation chamber. The apparatus further includes a mechanism for introducing a carrier gas into the gas inlet to mix with the sublimated radioactive iodine and form a gas mixture; a mechanism for withdrawing the gas mixture from the gas outlet; and a mechanism for separating at least some of the radioactive iodine from other components of the gas mixture.

Embodiments of the present invention operate to enhance fast fission in NEU targets by having neutrons undergo scattering or reflection after passing through a region of NEU. This is accomplished by having the target material interspersed with what is referred to as "neutron-reflecting" material, which reflects or scatters neutrons so that the neutrons travel a longer path before leaving the target material. This provides more opportunities for the neutrons to cause fission reactions with the NEU target material.

Thus, a given neutron tends to have multiple interactions (e.g., scattering events) with U-238 nuclei before it causes a fission reaction or leaves the region or regions occupied by NEU target material without being absorbed by the U-238. After a number of scattering events within the NEU target material, a neutron's energy will drop below the fission threshold. The target material can be interspersed with neutron-reflecting material according to a number of different geometrical arrangements.

The particular form of feedstock typically depends on the geometry of the irradiation chamber, the characteristics of the fission products that are to be extracted, and the manner of extracting the fission products. A preferred feedstock is in the form of depleted uranium. Depleted uranium is a byproduct of uranium enrichment and contains over 99.7% of U-238 as compared to natural uranium, which contains about 99.3% of U-238.

As well as maintaining the neutron energy above a fast fission threshold, it is preferred to maintain a sufficiently high neutron energy to minimize neutron absorption by U-238. When a neutron with slower energy is captured by U-238, Pu-239 is produced after subsequent decay of the excited U-238 atom. Using fast neutron sources instead, the probability of fission of U-238 becomes orders of magnitude higher than the probability of capture, resulting in greatly reduced production of Pu-239.

In one set of embodiments, the NEU and neutron-reflecting material are formed as alternating layers of NEU and neutron-reflecting material. The layers can take the form of spherical shells, cylindrical shells, flat plates and the like, with a fast neutron generator disposed near the center. In these embodiments, the irradiation chamber is generally spherical, generally cylindrical, or generally rectangular. Other geometries such as polygonal cylinders and polyhedrons are also possible, and may allow easier fabrication.

In another set of embodiments, the NEU occupies a plurality of parallel elongate regions with each region surrounded by neutron-reflecting material. The surrounding neutron-reflecting material can be formed as a plurality of tubes, and solid rods or crushed NEU can be disposed in the tubes. The NEU and surrounding neutron-reflecting material can occupy a cylindrical region with a hollow center for the fast neutron generator. Thus, in this set of embodiments, the irradiation chamber is generally cylindrical (circular or polygonal base).

In other embodiments, the NEU and neutron-reflecting material can both be formed as relatively small objects (say a few centimeters in size), and mixed in solid form or in a slurry. The slurry can be circulated in tubes surrounding the neutron generator. Embodiments where the NEU is in molten form, whether or not interspersed with neutron-reflecting material, can also be circulated. Circulating the NEU results in even irradiation of all the NEU in the chamber.

A further understanding of the nature and advantages of the present invention may be realized by reference to the remaining portions of the specification and the drawings, which are intended to be exemplary and not limiting.

DESCRIPTION OF SPECIFIC EMBODIMENTS

Overview of Embodiments

Figure 1:
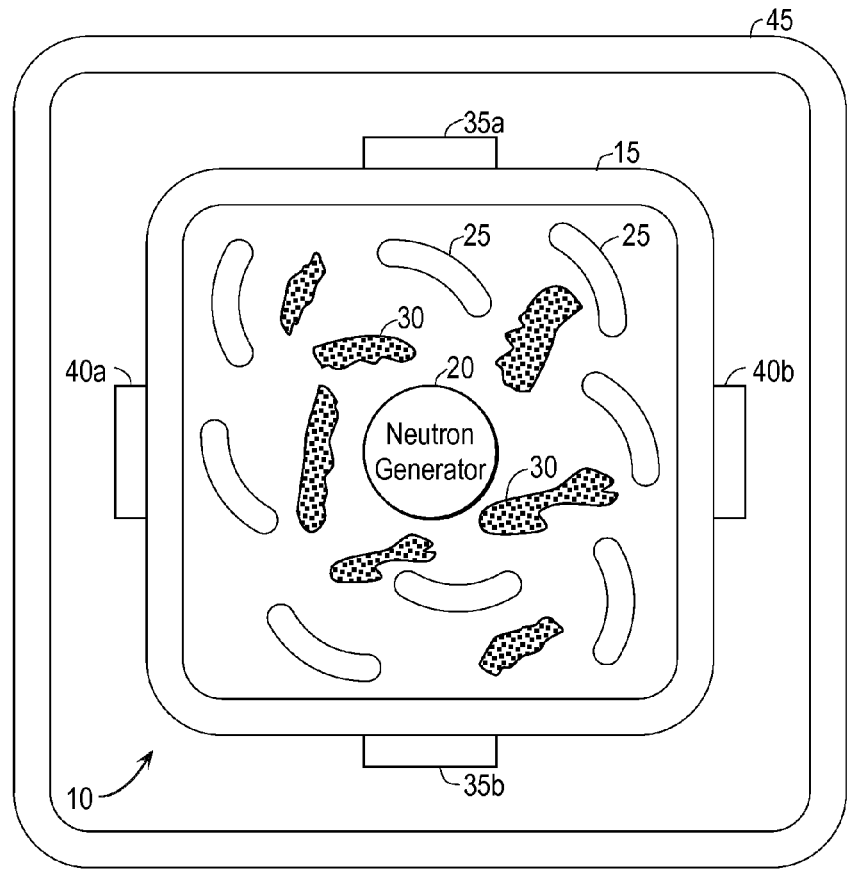
FIG. 1 is a stylized high-level schematic of a radioisotope generator according to an embodiment of the present invention.

FIG. 1 is a stylized high-level schematic of a radioisotope generator 10 according to an embodiment of the present invention, and is used to illustrate salient features that can be viewed as generic to the various embodiments discussed below. The main components of radioisotope generator 10 include an irradiation chamber 15, a fast neutron generator 20, and, for preferred embodiments, one or more neutron-reflecting elements 25. The irradiation chamber is configured to accept a charge of what is referred to as non-enriched uranium ("NEU").

As mentioned above, the NEU can be in any suitable form, including elemental metal, salt, alloy, molten salt, molten alloy, slurry, or other mixture, and can assume any one of a number of shapes and states, as will be described below. For purposes of generality, the NEU is shown as a plurality of arbitrary-shaped bodies 30 (stippled for clarity). The irradiation chamber is generally provided with mechanisms for introducing NEU into, and removing NEU from, the irradiation chamber, such as one or more fill ports 35a and one or more empty (drain) ports 35b. In some embodiments, it is desired to flow gas through the irradiation chamber, and to this end the chamber can be provided with one or more gas inlet ports 40a and one or more gas outlet ports 40b.

FIG. 1 also shows a neutron-absorbing outer containment chamber 45 surrounding the irradiation chamber. In representative embodiments, this outer containment chamber is an entirely separate structure from the irradiation chamber and can be built on site prior to installation of the radioisotope generator. Containment chamber 45 can be built as a concrete vault or bunker and lined with special neutron-absorbing material such as borated polyethylene. It is preferred that the outer containment chamber be significantly larger than the irradiation chamber so that the irradiation chamber subtends a relatively small solid angle at any point on walls of the outer containment chamber. This tends to reduce the likelihood of any slow neutrons scattered by the outer containment chamber walls getting back inside the irradiation chamber.

The walls of irradiation chamber 15 preferably include at least a layer of neutron-reflecting material, and so the combination of irradiation chamber 15's layer of neutron-reflecting elements, and neutron-reflecting elements 25 can be considered to define one or more neutron-reflecting regions disposed in or around the irradiation chamber. Some of the embodiments to be described below include separate neutron-reflecting elements inside the chamber, which may have the effect of subdividing the chamber into disjoint regions occupied by NEU material, while other embodiments provide a single contiguous region occupied by NEU material.

For generality, FIG. 1 shows the NEU as separate disjoint bodies, but the case of a single contiguous body of NEU material should be considered to fall within the scope of the invention. In keeping with the schematic nature of FIG. 1, the neutron-reflecting elements and the NEU bodies are shown as sparsely populating the irradiation chamber. In most embodiments, however, the regions of NEU material will generally fill hollow regions within the irradiation chamber so as to be surrounded by neutron-reflecting material. However, this does not preclude their being hollow portions of the chamber having neither neutron-reflecting material nor NEU material.

Embodiments of the present invention are not limited to any particular type of neutron generator. Representative systems can use a portable and compact accelerator that can accelerate and direct charged particles, or neutral particles, or deuterons, or tritons to targets that can be used to produce neutrons with energies that are above the 800 keV fast neutron fission threshold energy of U-238. The target materials can be elements, compounds, or solutions. Other target materials also can contain materials or compounds that are enriched with tritium atoms. Specifically, the fusing of deuterium atoms with tritium atoms produces 14.1-MeV neutrons which are used to cause fast fission reactions in the uranium atoms. When tritons are accelerated and fused with targets enriched with tritium atoms, the produced neutrons can encompass energies from below 0.1 eV to ~9.3 MeV.

Suitable neutron generators are commercially available, for example from Adelphi Technology Inc. 2003 East Bayshore Rd, Redwood City, Calif. 94063, Halliburton, 10200 Bellaire Blvd. Houston, Tex. 77072, and Schlumberger Technology, 300 Schlumberger Dr., Sugar Land, Tex. 77478.

The operation of radioisotope generator 10 can be summarized as follows. Neutron generator 20 provides neutrons above a fission threshold for U-238. The purpose of causing fission is to generate and extract one or more fission products that are, or decay to, desired radioisotopes.

Figure 2:
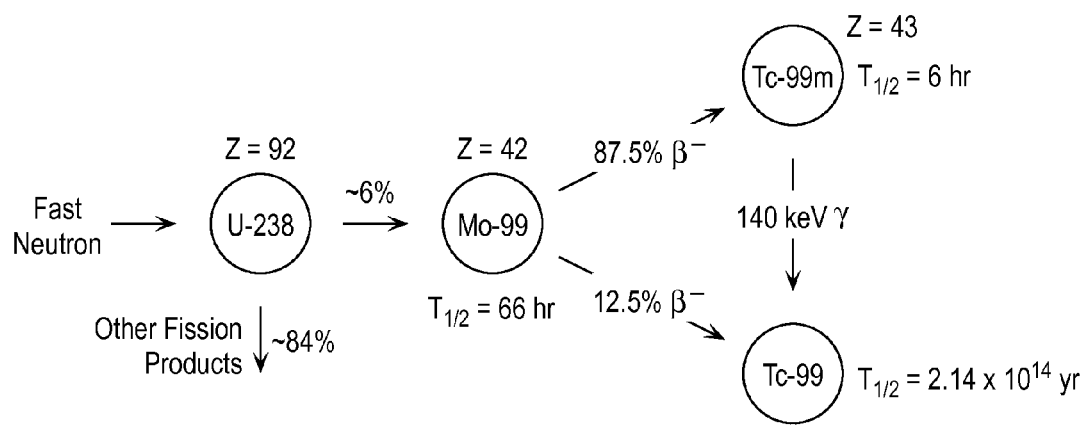
FIG. 2 shows the decay products of Mo-99 after it has been generated by fast fission of U-238.

FIG. 2 shows the decay products of Mo-99 (Z=42), which is one of the primary fission products, and is also produced through the decay chain. Mo-99 constitutes ~6% of the fission yield. Mo-99 will decay, with a half-life of 66 hours, to Tc-99 (12.5%) and Tc-99's metastable isomer Tc-99m (87.5%) (both Z=43). Both Mo-99 and Tc-99m can be recovered with chemical extraction processes and/or electrochemical separators. Embodiments will be described in the context of extracting Mo-99/Tc-99m. The neutrons are preferably maintained above energies where the neutron-absorption cross section for U-238 remains negligible. Thus, the NEU target does not breed plutonium (Pu-239). Other fission products include I-129, I-131, I-132, and I-133, which can also be recovered with chemical extraction processes and/or electrochemical separators.

The purpose, and operation, of the neutron-reflecting material is to increase the path length traveled by at least some neutrons from the neutron generator before those neutrons leave the irradiation chamber. Thus, as a neutron exits a region of NEU material, possibly having undergone one or more scattering interactions therein, it is reflected or scattered to enhance the likelihood that it will encounter additional NEU material and therefore have an increased chance to initiate a fission reaction. Iron is an example of an element that can act as neutron-reflecting material. In specific embodiments, stainless steel is used both for its structural and neutron-reflecting properties. For neutron energies above 800 keV, each scattering event with iron causes the neutron to lose about 0.56 MeV in energy. Thus, after a sufficient number of scattering events (depending on initial energy), the neutron will fall below the fast fission threshold.

Overview of Relevant Properties of Uranium and Fission Reactions

The literature concerning the properties of uranium and the physics of nuclear fission is vast, and is well understood by those skilled in the nuclear physics and engineering fields. For the sake of completeness, a short overview of the relevant aspects of this vast store of knowledge will be outlined to provide context for the description of embodiments of the present invention.

As discussed above, embodiments of the present invention use depleted or naturally occurring (i.e., non-enriched uranium or NEU) targets. Naturally occurring uranium is about 99.27% U-238, 0.72% U-235, and 0.0055% U-234. Depleted uranium is the by-product of the process of enriching naturally occurring uranium to achieve a higher proportion of U-235. Thus the depleted uranium contains significantly less U-235 and U-234 than natural uranium (say less than a third as much). There is no fundamental reason why embodiments of the present invention could not use pure U-238, but as a practical matter, that would be much more expensive.

Further, as discussed above, embodiments of the present invention irradiate NEU, largely containing U-238, with fast neutrons to cause fission. The most common nuclear reactors, on the other hand, irradiate U-235 with thermal neutrons to cause fission. Both U-235 and U-238 will undergo fission when struck with fast neutrons, but the characteristics are different.

First is the difference in fission cross section as a function of neutron energy for the two isotopes. U-235's fission cross section for fast neutrons is at least 250 times lower than for thermal neutrons. That is the reason why a nuclear reactor is used to produce Mo-99 using targets enriched with U-235, since the neutrons within a nuclear reactor are typically thermalized. Thermal neutrons cannot cause fission in U-238.

Second is the nature of the reaction. U-235 is fissile, meaning that it can sustain a chain reaction when a critical mass is present, since the neutrons resulting from the fission reactions have energies where U-235's fission cross section is high. U-238, on the other hand, while fissionable, is not fissile. While U-238 can be made to fission when struck with fast neutrons, most of the neutrons resulting from the fission reactions have energies that are not sufficiently high to cause additional U-238 fission.

Figure 3:
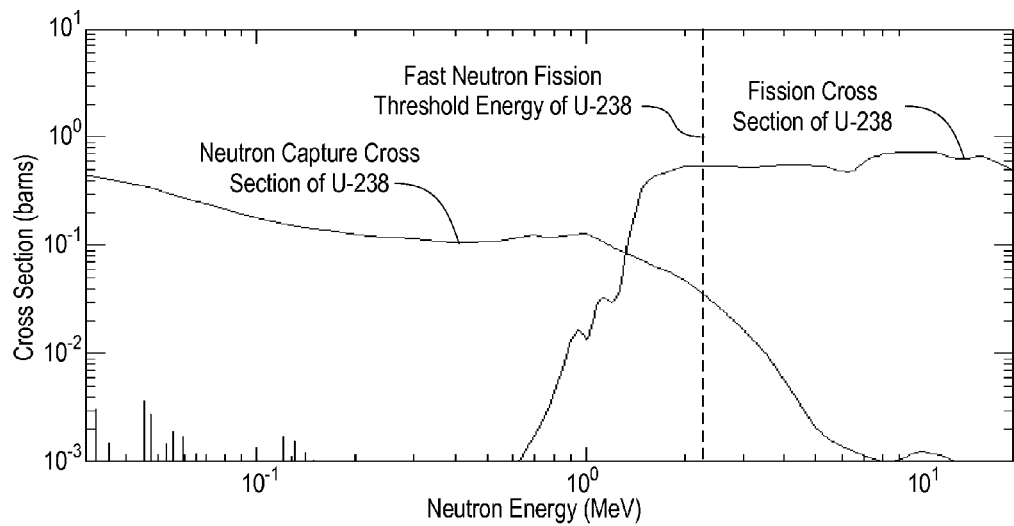
FIG. 3 is a graph of U-238's fission cross section and neutron capture cross section as functions of neutron energy.

FIG. 3 is a graph of U-238's fission cross section and neutron capture cross section as functions of neutron energy. This graph was generated using the tools provided at http://atom.kaeri.re.kr/cgi-bin/endfplot.pl. U-238 also has a reaction path where it absorbs a neutron and, after two beta decays, becomes Pu-239. While this reaction path may be desirable in breeder reactors, embodiments of the invention seek to reduce the probability of neutron absorption by maintaining neutron energies in a range where the cross section for fission far exceeds the cross section for neutron absorption. For example, as can be seen in the graph of FIG. 3, the two cross sections are equal at a neutron energy of ~1.3 MeV, while at 2.2 MeV, the fission cross section is ~20 times larger. Accordingly, it is preferred to minimize or eliminate materials that would act as moderators.

As can be seen from the graph of U-238's fission cross section as a function of neutron energy, the fission cross section plateaus between 1 and 2 MeV, the neutron capture cross section is rapidly falling off in this range of energies.

It should be understood that a fast neutron can transverse its entire path through the NEU without causing a fission reaction. This fast neutron also can be scattered or reflected from U-238 nuclei. The neutron-reflecting or scattering material is used to enhance the probability that a fast neutron will ultimately interact with a U-238 nucleus and cause a fission reaction before its energy drops below the 800 keV threshold. Once this fast neutron interacts with U-238 and causes a fission reaction, this neutron essentially is gone. There will be 2-3 neutrons born after the fission reaction (prompt neutrons), and some of these neutrons can cause some addition fission in the NEU if their energies can stay above the 800 keV threshold.

Overview of Representative Geometrical Configurations

Figure 4:
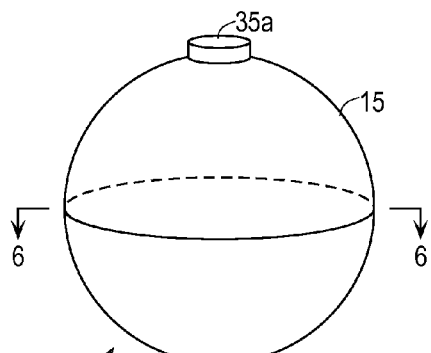
FIG. 4 is a simplified oblique view of a radioisotope generator having a spherical irradiation chamber according to an embodiment of the present invention.

FIG. 4 is a simplified oblique view of a radioisotope generator $10_{sphere}$ having a spherical irradiation chamber according to an embodiment of the present invention. Fill port 35a is shown, but drain port 35b would be hidden from view. The chamber is preferably fabricated in at least two sections, which is signified by an equatorial line (the hidden half being shown in phantom). The equatorial line also denotes the intersection of a horizontal plane that is designated by a section line 6-6. For simplicity, gas inlet port(s) 40a and gas outlet port(s) 40b are not shown.

Figure 5:
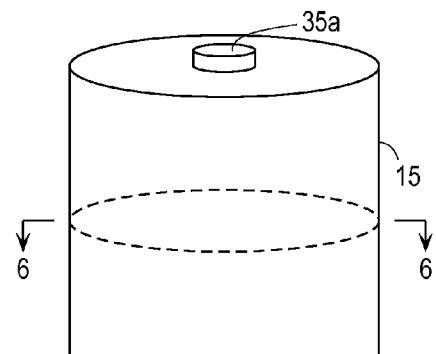
FIG. 5 is a simplified oblique view of a radioisotope generator having a cylindrical irradiation chamber according to an embodiment of the present invention.

FIG. 5 is a simplified oblique view of a radioisotope generator $10_{cyl}$ having a cylindrical irradiation chamber according to an embodiment of the present invention. Again, fill port 35a is shown, but drain port 35b would be hidden from view. Also, gas inlet port(s) 40a and gas outlet port(s) 40b are not shown. Shown in phantom is the intersection of a horizontal plane that is designated by a section line (also 6-6). The cylindrical wall of irradiation chamber 15 need not be fabricated in multiple sections, although it can be. In such a case, the phantom line designating the intersection of the horizontal plane could be drawn in solid on the visible portion of the cylindrical wall.

Figure 6:
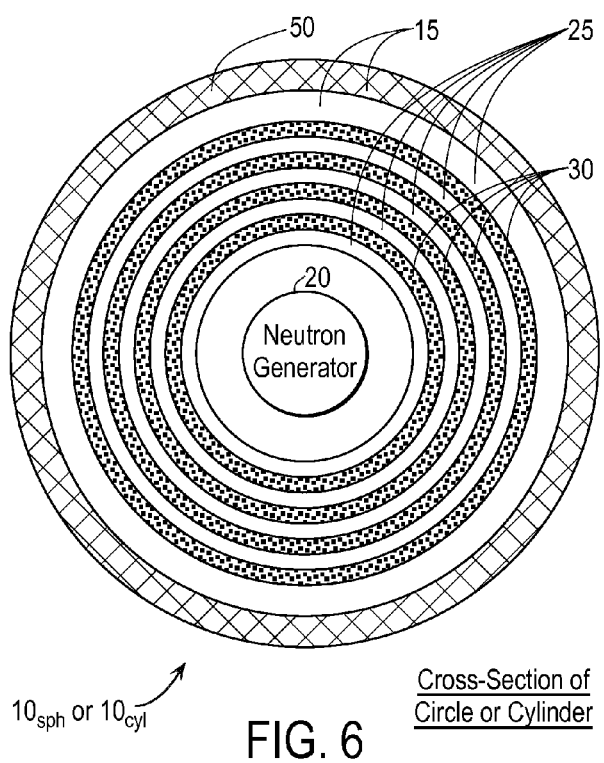
FIG. 6 is a simplified cross-sectional view that applies to either of the radioisotope generators shown in FIGS. 4 and 5 and is taken along line 6-6 in FIGS. 4 and 5.

FIG. 6 is a simplified cross-sectional view that applies to either of radioisotope generators $10_{sphere}$ and $10_{cyl}$, and is taken along line 6-6 in FIGS. 4 and 5. For the spherical embodiment $10_{sphere}$, neutron-reflecting elements 25 are formed as a plurality of spaced concentric spherical shells that surround neutron generator 20. For the cylindrical embodiment $10_{cyl}$, neutron-reflecting elements 25 are formed as a plurality of spaced coaxial cylindrical shells that surround neutron generator 20.

In both embodiments, NEU bodies or regions 30 partially or fully occupy the spaces between neutron-reflecting shells 25. The drawing is simplified in that it doesn't show holes in the neutron-reflecting shells that allow NEU material introduced in one region to find its way to other regions. Further, it is contemplated that there may be bulkheads, again not shown, that maintain the spacing between the shells and provide additional structural strength.

For both embodiments, the outermost neutron-reflecting shell, which is shown as being thicker than the radially inward shells, at least partially defines irradiation chamber 15. While a plurality of regions for NEU are shown, some embodiments can have only one region (spherical or cylindrical shell as the case may be). Furthermore, the outermost neutron-reflecting shell need not be thicker than the inner one or ones.

Radially outward of the outermost neutron-reflecting shell is a biological shield 50, which is used to block ionizing radiation such as alpha particles, electrons, and gamma rays that might leak out of the neutron-reflecting shell. Biological shield 50 also can be considered to partially define irradiation chamber 15. Such a shield can be made of materials such as lead, iron, borated polyethylene, or a combination of any or all of such materials.

While specific dimensions do not form a part of the invention, some representative dimensions, or at least factors that can be considered in specifying particular dimensions will be discussed. For example, the NEU can be formed in a single layer on the order of 30 to 50 cm thick, or a combination of multiple layers on the order of 10 cm thick and separated by stainless steel layers on the order of 0.5 cm thick. In this way, when the neutron energy falls below 1 MeV after multiple scattering events, the neutron will leak out of the outermost layer of the NEU. A distance of containment chamber 45's walls from irradiation chamber 15 on the order of 2.5 meters is representative.

Figure 7:
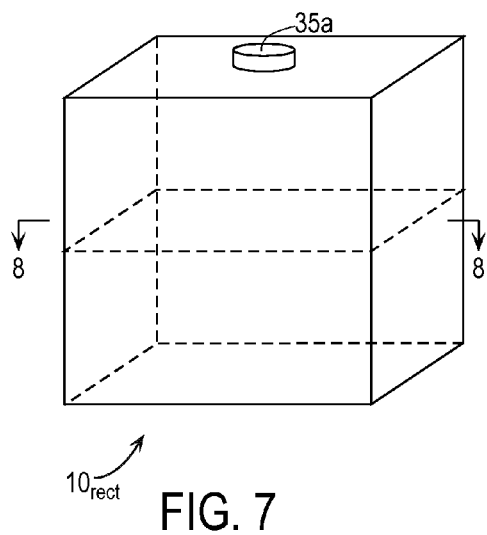
FIG. 7 is a is a simplified oblique view of a radioisotope generator having a rectangular-prism-shaped irradiation chamber according to an embodiment of the present invention.

FIG. 7 is a is a simplified oblique view of a radioisotope generator $10_{rect}$ having a rectangular-prism-shaped irradiation chamber according to an embodiment of the present invention. Again, fill port 35a is shown, but drain port 35b would be hidden from view. Also, gas inlet port(s) 40a and gas outlet port(s) 40b are not shown. Shown in phantom is the intersection of a horizontal plane that is designated by a section line 8-8.

Figure 8:
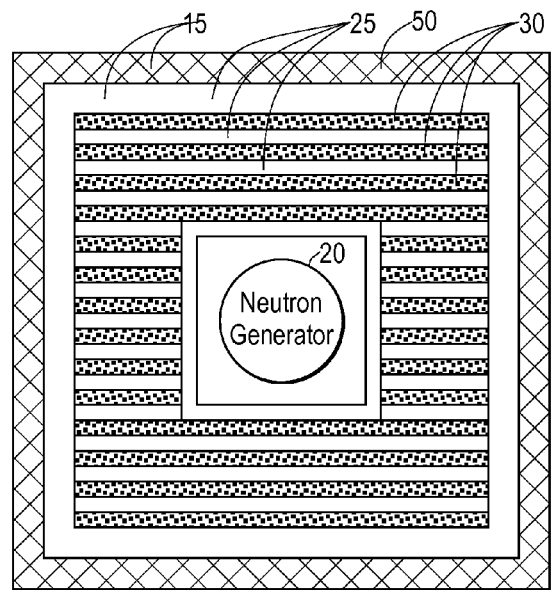
FIG. 8 is a simplified cross-sectional view of the radioisotope generator shown in FIG. 7 and is taken along line 8-8 in FIG. 7.

FIG. 8 is a simplified cross-sectional view of the radioisotope generator shown in FIG. 7 and is taken along line 8-8 in FIG. 7. In this embodiment, neutron-reflecting elements 25 are formed as a plurality of spaced parallel plates, some of which are cut away or shortened to provide a cavity for neutron generator 20. NEU bodies or regions 30 partially or fully occupy the spaces between neutron-reflecting plates 25.

Figure 9:
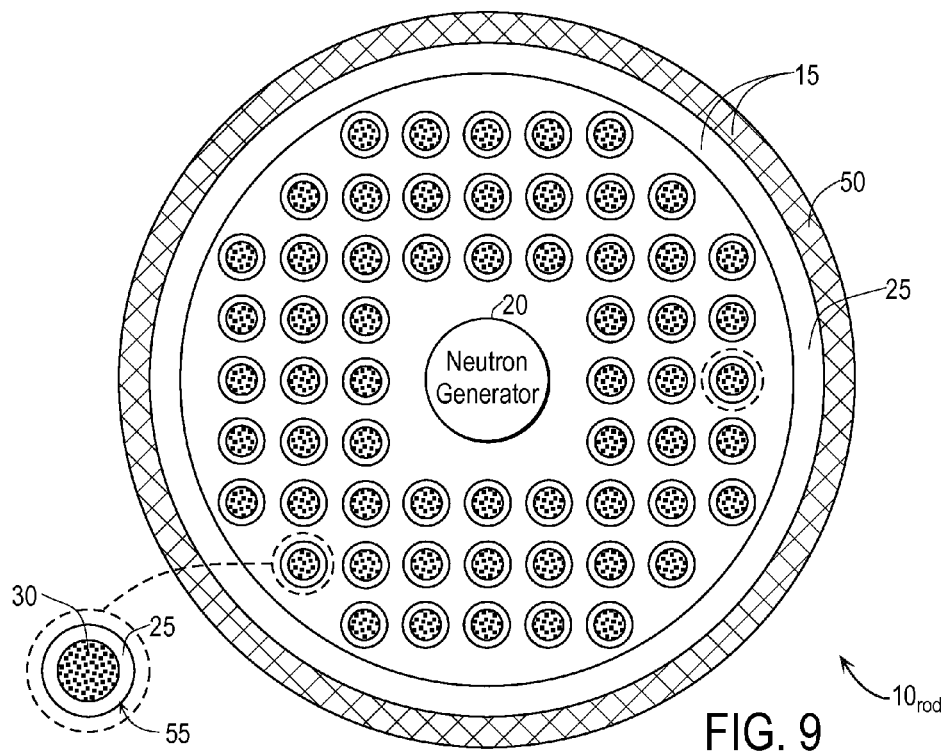
FIG. 9 is a simplified cross-sectional view of a radioisotope generator where the NEU is in the form of rods.

FIG. 9 is a simplified cross-sectional view of a radioisotope generator $10_{rod}$ where the NEU is in the form of rods 55, one of which is shown enlarged. As can be seen, each rod comprises a tubular shell of neutron-reflecting material 25 surrounding a bore 44 containing NEU 30. The rods are shown as circular in cross section, but polygonal tubes can also be used. A circular cross section is generally preferred since that is generally the most common and would be more economical to manufacture and operate. A circular cross section has the additional advantages of the greatest structural integrity and efficiency for the propagation of fast neutrons.

The tubes are shown disposed in a cylindrical irradiation chamber, but there is no requirement. As schematically drawn, rods are laid out in an octagonal array, and so an octagonal irradiation chamber could also be used. The rods could also be distributed along a set of concentric circles so that their axes would lie in concentric cylindrical surfaces.

Process Overview

Figure 10:
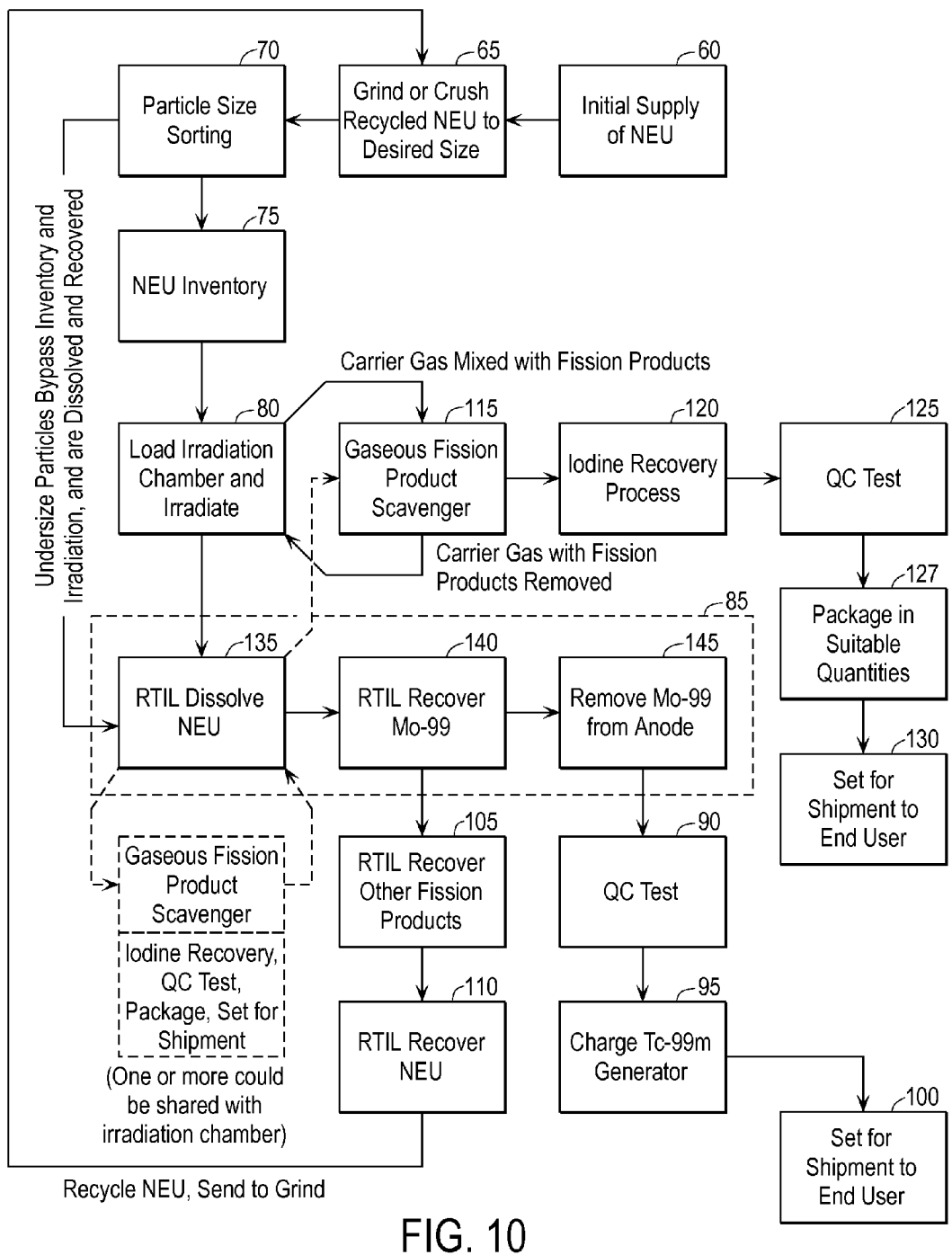
FIG. 10 is a process schematic for the generation of radioisotopes according to an embodiment of the present invention.

FIG. 10 is a process schematic for the generation of radioisotopes according to an exemplary embodiment of the present invention. Each block in the schematic represents an operation, but many of the blocks also represent a physical piece of apparatus. The connector lines represent logical flow as well as material flow, so the figure can also be viewed as a flowchart.

The production can be considered to begin with providing an initial supply of NEU (operation 60), which in this exemplary embodiment is depleted uranium. This exemplary embodiment uses NEU in granular form, and so NEU is then subjected to a grinding operation 65 and a sorting operation 70 that rejects undersized pieces of NEU. The pieces meeting the desired size criteria are sent to an inventory 75 of NEU in a suitable form or state, and the undersized pieces are diverted to bypass the inventory and are subjected to further processing as will be described below. Grinding and sorting operations 65 and 70 can also be used for recycling NEU as will be described below.

For the sake of this exemplary embodiment, a suitable form would be NEU that had been ground or crushed to "pebbles" of desired nominal size, say on the order of no less than 0.64 cm (¼-inch) in the smallest dimension and no more than 12.7 cm (½-inch) in the largest dimension. The NEU is loaded into the radioisotope generator, say by gravity through fill port(s) 35a (not shown in FIG. 10), and irradiated for a suitable period of time with neutrons of a suitable energy (operation 80). In one exemplary embodiment, the NEU is irradiated with $3.5 \times 10^{13}$ neutrons/second for 20 hours using 14.1-MeV neutrons. This provides a balance between production and decay. For the example of a single 30-cm spherical shell of NEU having an outer diameter of 182.88 cm (6 feet), the mass of the NEU would be on the order of 22,000 kg.

After irradiation, the NEU, which now contains fission products, including the desired fission products and other fission products, is removed from the radioisotope generator, say by gravity through drain port(s) 35b (not shown in FIG. 10), subjected to a radioisotope recovery operation 85 to provide the desired fission product, in this case Mo-99. The recovered Mo-99 is then subjected to a quality control testing operation 90, is used to charge a Tc-99m generator (operation 95), and the Tc-99m generator is set for shipment to an end user (operation 100). By way of example, a single generator may contain 6 curies and would be used to prepare a large number of individual patient doses that might be on the order of 10-30 microcuries per patient.

The NEU from which the Mo-99 has been recovered is subjected to a separate recovery operation 105 to remove the other fission products, some of which may be desirable radioisotopes, and is then subjected to yet another recovery operation 110 to recover the NEU for recycling. As will be described below, the recovery operations can use ionic liquids, and more specifically room-temperature ionic liquids (RTILs).

The recovered NEU provided by recovery operation 110 is returned to be subjected to grinding and sorting operations, which can be the same grinding and sorting operations 65 and 70 used for the NEU that is originally provided to the system. As for the originally provided NEU, the sorting operation rejects undersized pieces of NEU. The pieces meeting the desired size criteria are returned to the NEU inventory, and the undersized pieces are diverted to bypass the inventory and irradiation chamber.

The irradiation and fission can also give rise to various fission products in a gaseous state. These gaseous fission products include fission products that are themselves gases (e.g., xenon and kryton), and iodine (e.g., I-129, I-131, I-132, I-133, etc.), which is a solid, but easily sublimates. In some traditional systems using HEU, the HEU target elements are encapsulated. Thus, these gaseous fission products would be trapped in the encapsulated target elements, and the gaseous fission products would be captured after irradiation in connection with the Mo-99 recovery. Additionally, to the extent that gaseous fission products leaked out of the target, the iodine would dissolve in the water that acted as a coolant and moderator.

In this exemplary embodiment, the gaseous fission products (i.e., fission gases and sublimated iodine) are extracted during irradiation. Thus, while the Mo-99 is recovered on a batch basis, the gaseous fission products can be collected on a continuous basis. As will be discussed below, some of the fission gases and iodine remain trapped within the NEU matrix and are recovered on a batch basis.

In this exemplary embodiment, the irradiation chamber is provided with one or more gas inlet ports 40a and one or more gas outlet ports 40b (shown schematically in FIG. 1). Further, provision is made for fluid communication between the gas inlet and outlet ports and the NEU in the irradiation chamber. An inert carrier gas (e.g., argon) is introduced into an inlet port and circulated through the irradiation chamber where it mixes with the gaseous fission products. The gas exiting an outlet port of the irradiation chamber is subjected to a scavenging operation 115 to remove the gaseous fission products before the gas is reintroduced into an inlet port of the irradiation chamber.

The gases removed by scavenging operation 115 are subjected to one or more recovery operations 120, one of which is shown. This can be a standard chemical extraction processes or a standard electrochemical separation. In this exemplary embodiment, it is desired to extract iodine (with I-131 often being the radioisotope of greatest interest), which can be captured in a silver zeolite trap, and the remaining gaseous fission products captured in HEPA filters for disposal. The iodine (including I-131) is then subjected to a quality control testing operation 125, packaged in suitable quantities (operation 127), and set for shipment to an end user (operation 130).

References Burger_2004 ("HWVP Iodine Trap Evaluation"), Chapman 2010 ("Radioactive Iodine Capture in Silver-Containing Mordenites through Nanoscale Silver Iodide Formation"), and Wang_2006 ("Simulating Gaseous $^{131}$I Distribution in a Silver Zeolite Cartridge Using Sodium Iodide Solution") provide additional background for the iodine recovery.

The field of isotope extraction and separation is well developed, and Mo-99 recovery process 85 could use techniques such as chemical extraction processes and/or electrochemical separation processes. For example, generalized procedures for the recovery of Mo-99 from HEU have been developed in connection with nuclear-reactor-based operations. The HEU is normally encapsulated in a dispersion-type target with aluminum cladding, and the HEU can take the form of mini fuel plates or pins. After irradiation (typically 10-12 days), the targets are removed from the reactor and cooled for several hours in the pool adjacent to the reactor before being transported to the processing hot cell.

The targets are then dissolved in nitric acid, with the possible addition of mercury (II) nitrate ($Hg(NO_3)_2$) to assist the dissolution of the aluminum. Following dissolution, the solution is fed to an alumina or polymer column, and the Mo-99 is adsorbed on the column with minor amounts of other components including heavy metals. Once the column is loaded with the Mo-99, the column is washed with nitric acid and then water, and then Mo-99 is stripped from the column using an ammonium-hydroxide solution. Purification is carried out to remove as much of the heavy metals as possible. Some producers have to carry out many purification steps in order to reduce the heavy metal concentrations to the level to meet FDA requirements.

Chapter 2 of Reference NRC_2004 ("Medical Isotope Production without Highly Enriched Uranium") provides a description of Molybdenum-99/Technetium-99m production and use, with a description of the dissolution and Mo-99 recovery at pages 25-30.

In this exemplary embodiment, Mo-99 recovery process 85 uses ionic liquids, and more specifically room-temperature ionic liquids (RTILs). The recovery process includes a series of sub-processes, as will now be described. Initially, the NEU (including the fission products) that is unloaded from the irradiation chamber is dissolved in an RTIL (operation 135), and the Mo-99 is recovered from the solution (operation 140). Recovery operation 140, for this exemplary embodiment, entails electrodepositing the Mo-99 onto an anode. The recovered Mo-99 is then removed from the anode (operation 145). For sacrificial anodes, this can entail dissolving or otherwise destroying the anode with a higher charge. In the case of a permanent anode, this can include techniques such as scraping.

References Pemberton_2008 ("Solubility and Electrochemistry of Uranyl Carbonate in a Room Temperature Ionic Liquid System") and Pemberton_2009 ("Solubility and Electrochemistry of Uranium Extracted into a Room Temperature Ionic Liquid") provide addition background.

The above description of the iodine recovery was somewhat simplified, and will be explained in greater detail below. In many circumstances, some of the fission gases and some of the iodine fission product remain trapped in the NEU, and are released during Mo-99 recovery. To recover desired radioisotopes, provision is made to scavenge fission gases and sublimated iodine released during the Mo-99 recovery, to extract the iodine (including I-131), to subject the recovered iodine to quality control testing, to package the iodine, and to set the packaged iodine for shipment. This is shown schematically in phantom blocks associated with the NEU dissolution (operation 135).

These blocks correspond generally to scavenging operation 115, recovery operation(s) 120, quality control testing operation 125, packaging operation 127, and setting for shipment operation 130 that are performed during irradiation of the NEU. While these blocks represent operations that are performed at different times, one or more may be implemented using the same apparatus that is used to perform these operations during irradiation. This is denoted by the legend "(One or more could be shared with irradiation chamber)." That possibility is also denoted schematically by a dashed arrow from NEU dissolution operation 135 to the gas scavenging operation 115 that is associated with irradiating the NEU (operation 80).

Specific Embodiment with Cylindrical Irradiation Chamber with Parallel NEU Rods

Figure 11A:
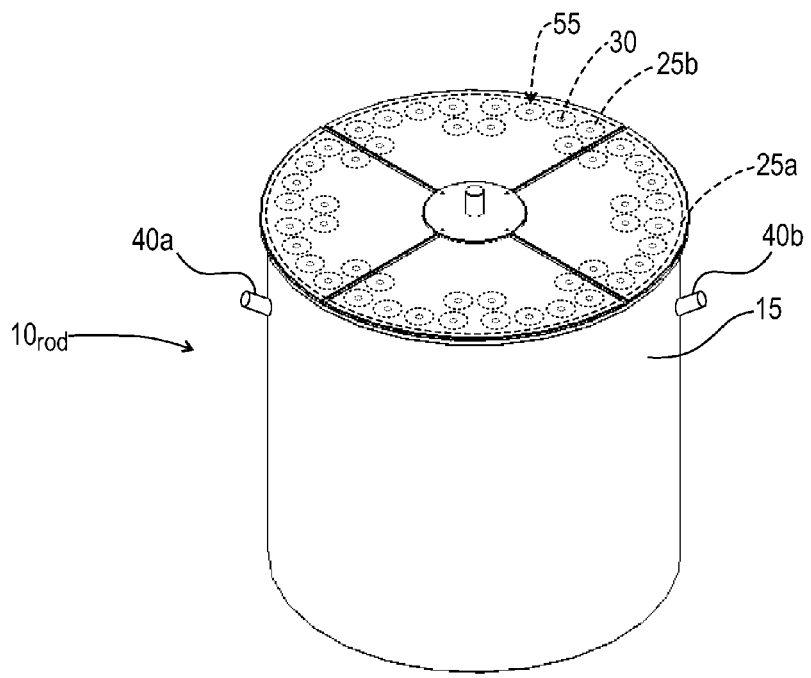
FIG. 11A is a perspective view of a radioisotope generator according to a specific embodiment having a cylindrical irradiation chamber with parallel NEU rods.
Figure 11B:
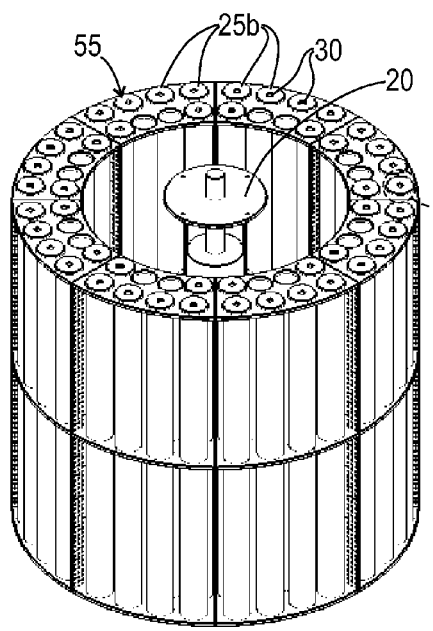
FIG. 11B is a perspective, cutaway view of the radioisotope generator shown in FIG. 11A with the cover and the outer cylinder removed.
Figure 11C:
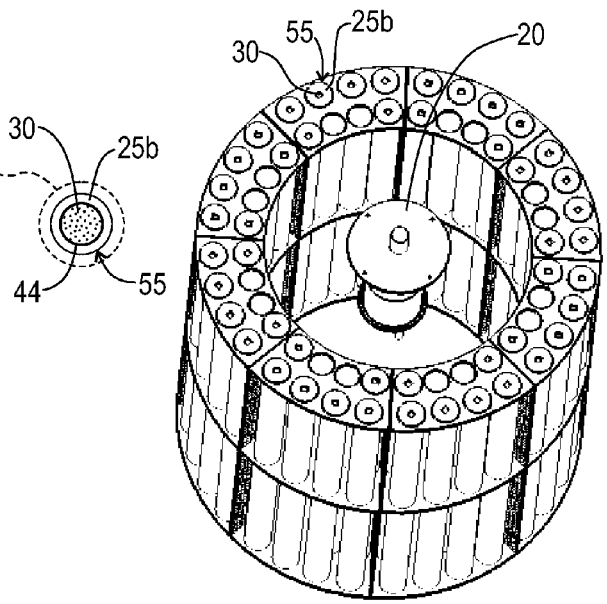
FIG. 11C is a perspective cutaway view of the radioisotope generator shown in FIG. 11A taken from a different view to show additional details.

FIG. 11A is a perspective view of a radioisotope generator according to a specific embodiment having a cylindrical irradiation chamber in which are disposed parallel cylindrical NEU rods. FIG. 11B is a perspective, cutaway view of the radioisotope generator shown in FIG. 11A with the cover and the outer cylinder removed, exposing the tube assemblies and neutron generator. FIG. 11C is a perspective cutaway view of the radioisotope generator shown in FIG. 11A taken from a different view to show additional details of the tube assembly and the neutron generator.

Generation and Recovery of Radioactive Iodine Isotopes Including I-131

As mentioned above, the irradiation and fission give rise to various fission products, and some of these are in gaseous states. Radioactive iodine 131 (sometimes referred to as $^{131}$I, radioiodine 131, or simply I-131) is not a fission gas, but readily sublimates, and so is one of these gaseous fission products, and is an important radioisotope to be recovered. Embodiments of the invention are designed with the production and recovery of I-131 and other radioactive iodine isotopes in mind.

An iodine isotope of major interest is I-131, but the fission products include a number of other radioactive iodine isotopes and other elements that decay to radioactive iodine.

Properties and Uses of I-131

I-131 (atomic number Z=53, 78 neutrons) has a half-life of 8.02 days and used for a variety of applications. These include diagnostic and therapeutic thyroid applications (in either a solution or capsule form), industrial tracers, and various research applications such as antibody labeling. I-131 is also used to label antibodies for therapeutic applications in the treatment of cancers.

Examples of its use in radiation therapy include the treatment of thyrotoxicosis and thyroid cancer. When a small dose of I-131 is swallowed, it is absorbed into the bloodstream in the gastrointestinal (GI) tract and concentrated from the blood by the thyroid gland, where it begins destroying the gland's cells. Diagnostic tests exploit the mechanism of absorption of iodine by the normal cells of the thyroid gland. As an example I-131 is one of the radioactive isotopes of iodine that can be used to test how well the thyroid gland is functioning.

Figure 12:
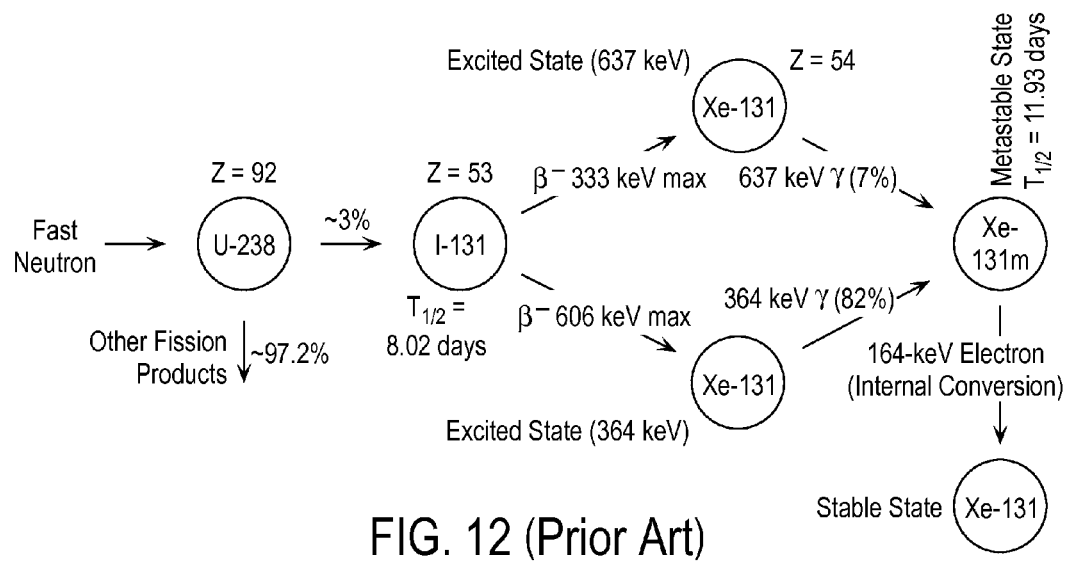
FIG. 12 shows the decay products of I-131 after it has been generated by fast fission of U-238.

FIG. 12 shows the decay products of I-131, which is one of the primary fission products, and constitutes on the order of 3% of the total fission yield. In short, the I-131 decays to xenon 131, or Xe-131 (Z=54, 77 neutrons), emitting a beta particle ($\beta^-$, a gamma ($\gamma$) ray, and a neutrino ($\nu$) in the process. The primary emissions of I-131 decay are 364-keV $\gamma$ rays (81% abundance) and 606-keV $\beta^-$ particles (89% abundance).

As shown in more detail in FIG. 12, the decay is actually a two-step process where the I-131 first decays by beta decay to one of a number of excited states of Xe-131, emitting a $\beta^-$ particle and a neutrino in the process, and Xe-131 in the excited state falls to a metastable state (Xe-131m), emitting a $\gamma$ ray in the process. The first step occurs with a half-life of about 8 days, while the second step is, for present purposes, immediate.

FIG. 12 is simplified in that only two of the excited states are shown, a first that is 637 keV above the metastable state, and a second that is 364 keV above the metastable state. The beta decay to the first state results in beta particles having a range of energies between zero and a maximum of 333 keV, while the beta decay to the second state results in beta particles having a range of energies between zero and a maximum of 606 keV. The remaining energy is carried off by the neutrino. In 82% of the decays to the metastable state, a 364-keV gamma ray is emitted, and in 7% of decays the decays to the metastable state, a 637-keV gamma ray is emitted. Other decay mechanisms make up the other 11% of decays to the ground state.

The metastable isomer Xe-131m has a half life of 11.93 days, and undergoes an isomeric transition to the stable isotope Xe-131 by the mechanism of internal conversion, ejecting a single 164-keV electron in the process. Xe-131 is one of xenon's nine stable isotopes, and constitutes 21.2% of naturally occurring xenon.

FIG. 12 shows I-131 as a fission product, which includes some I-131 nuclei which are primary fission product (fission fragments) and also includes some nuclei that are decay products of other fission products. For example, fission fragments and fission products in the chain include:

indium 131 (In-131, Z=49, 82 neutrons), which beta decays with a half-life of less than a second to tin 131 (Sn-131, Z=50, 81 neutrons);

Sn-131, which beta decays with a half-life of less than a minute to antimony 131 (Sb-131, Z=51, 80 neutrons);

Sb-131, which beta decays with a half-life of 23 minutes to two isomers of tellurium 131 (Te-131 and Te-131*, Z=52, 79 neutrons);

Te-131, which beta decays with a half-life of 25 minutes to I-131 (Z=53, 78 neutrons); and (Te-131*, which undergoes an isomeric transition with a half-life on the order of 30 hours to Te-131, which beta decays to I-131 as above).

The total of the I-131 fission fragments and the I-131 decay products make up on the order of 3% of the total fission yield.

Properties and Uses of Other Radioactive Iodine Isotopes

As noted above, the fission products include a number of iodine isotopes in addition to I-131. The longer-lived radioactive fission products include the following (also shown are half-lives and fission yield):

I-129 (1.59 million years, 0.54%);
I-131(8.042 days, ~3%);
I-132 (2.29 hours (metastable isomer 1.4 hours), 4.31%);
I-133 (20.8 hours (metastable isomer 9 seconds), 6.77%);
I-134 (52.6 minutes, 7.87%); and
I-135 (6.6 hours, 6.54%).

At least some of these isotopes have applications in imaging and/or medical therapy (the most useful are believed to be I-131, I-132, and I-133).

Embodiments of the present invention also can produce radioactive iodine isotopes up to I-142. Depending on the application, it is believed that the radioactive iodine produced by embodiments of the present invention will have lower dose requirements than pure I-131 produced by other techniques. I-130 (12.4 hours (metastable isomer 8.9 minutes)) is not a fission product since it is not a fission fragment and would only be produced in a decay chain from Te-130, except that Te-130 has a half life on the order of $2.5 \times 10^{21}$ years. Radioactive iodine isotopes below I-127 are not fission fragments and are not decay chain products since they are blocked by stable elements.

Other radioactive iodine isotopes are short-lived (hours or minutes) and occur in very small amounts, and can be ignored as a practical matter. I-129 accounts for 0.54% of the primary fission yields and has a half-life of 15.9 million years, thus being essentially stable. It is possible to separate these radioactive iodine isotopes, and depending on the application, there may be reasons to do so.

I-132 and I-133 are additional radioactive iodine isotopes that are of interest. The I-132 production scheme is as follows.

indium 132 (In-132, Z=49, 83 neutrons), which beta decays with a half-life of less than a second to tin 132 (Sn-132, Z=50, 82 neutrons);

Sn-132, which beta decays with a half-life of 40 seconds to two isomers of antimony 132 (Sb-132 and Sb-132*, Z=51, 81 neutrons);

Sb-132 and Sb-132*, which beta decay with respective half-lives of 4.2 minutes and 2.8 minutes to tellurium 132 (Te-132, Z=52, 80 neutrons);

Te-132, which beta decays with a half-life of 3.2 days to two isomers of iodine 132 (I-132 and I-132*, Z=53, 79 neutrons);

I-132, which beta decays with a half-life of 2.28 hours to xenon 132 (Xe-132, Z=54, 78 neutrons); and (I-132*, which undergoes an isomeric transition with a half-life of 1.4 hours to I-132, which beta decays to to Xe-132 as above).

The total of the I-132 fission fragments and the I-132 decay products make up on the order of 4.31% of the total fission yields.

The I-133 production scheme is as follows.

indium 133 (In-133, Z=49, 84 neutrons), which beta decays with a half-life of less than a second to tin 133 (Sn-133, Z=50, 83 neutrons);

Sn-133, which beta decays with a half-life of 1.4 seconds to antimony 133 (Sb-133, Z=51, 82 neutrons);

Sb-133, which beta decays with a half-life of 2.5 minutes to two isomers of tellurium 133 (Te-133 and Te-133*, Z=52, 81 neutrons);

Te-133, which beta decays with a half-life of 12.4 minutes to two isomers of iodine 133 (I-133 and I-133*, Z=53, 80 neutrons);

(Te-133*, which undergoes an isomeric transition with a half-life of 55.4 minutes to Te-133);

I-133, which beta decays with a half-life of 20.8 hours to two isomers of xenon 133 (Xe-133 and Xe-133*, Z=54, 79 neutrons);

(I-133*, which undergoes an isomeric transition with a half-life of 9 seconds to I-133, which beta decays to Xe-133 and Xe-133* as above; and Xe-133, which beta decays with a half-life of 5.24 days to cesium 133 (Cs-133, Z=55, 78 neutrons); and (Xe-133*, which undergoes an isomeric transition with a half-life of 2.19 days to Xe-133, which beta decays to Cs-133 as above).

The total of the I-133 fission fragments and the I-133 decay products make up on the order of 6.7% of the total fission yields.

Where the end result of the iodine decay is an inert isotope of xenon (e.g., Xe-131, Xe-132, and Xe-133), there is no problem. Otherwise, the processing may entail additional operations. If the end result is not a stable xenon isotope, it may be desirable to separate it out, for example using electrochemical techniques or ion-exchange chromatography (ion chromatography). This would be the case for relatively long-lived radioactive substances or for undesirable stable substances such as barium, cerium, and cesium.

Some short-lived radioactive substances can be addressed by allowing the extracted iodine additional time so the radioactive end result substance can decay to a stable substance or a radioactive substance that is susceptible of separation. For example, I-133 decays to stable Cs-133, but I-135 and I-137 decay to radioactive cesium isotopes, which are considered undesirable for both imaging and therapeutic applications.

Since the irradiation cycle is on the order of 20 hours, one approach is to let the collected radioactive iodine decay for about a day (~4 half-lives for I-135, and more than 1000 half-lives for I-137) so that the radioactive cesium can be electrochemically separated or separated through ion-exchange chromatography from the iodine solution. As a result, the resulting iodine solution would contain mainly I-127 (non-radioactive), I-129, I-131, I-132, and I-133, which could be used both for both therapeutic and imaging applications.

I-132 has a relatively short half-life—2.29 hours with an isomeric transition of I-132* of 1.39 hours. Since I-132's half-life is short, that means it decays quickly within the body, so that there is no lingering radioactivity after the procedure and the dosage is much lower than other iodine imaging isotopes.

Radioisotope Generator Tailored for Generation of I-131 and Other Radioactive Iodine Isotopes Any of the above irradiation chamber designs can be adapted to enhance the extraction of the gaseous fission products (including I-131 and other radioactive iodine isotopes, which sublimate to a gaseous state). In particular, as mentioned above, it is desired to withdraw the gaseous fission products from the irradiation chamber during irradiation by introducing an inert carrier gas (e.g., argon, which is inert and relatively cheap due to its large natural occurrence), circulating it through the irradiation chamber to mix with the fission gases, and exhausting the gas mixture for further processing.

Figure 13:
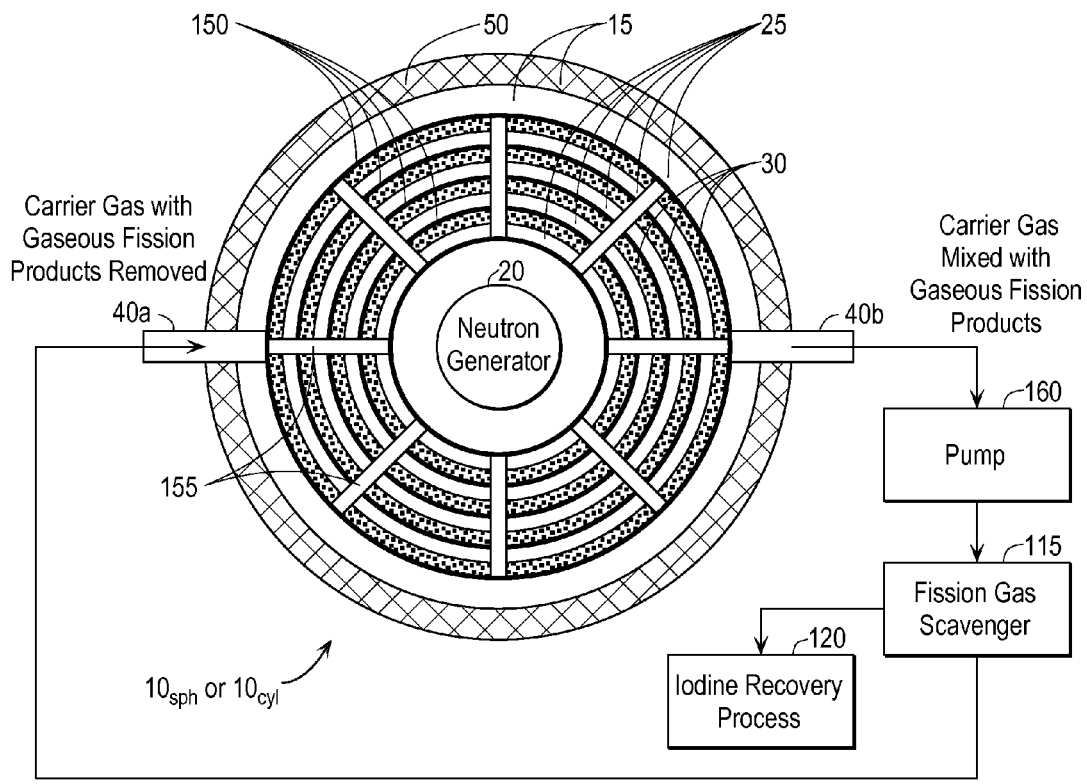
FIG. 13 is a is a simplified cross-sectional view of a radioisotope generator such as that shown in the sectional view of FIG. 6, with additional details relating to the circulation of gas through the irradiation chamber.

FIG. 13 is a simplified cross-sectional view of a radioisotope generator such as that shown in the sectional view of FIG. 6 (e.g., radioisotope generator $10_{sphere}$ or $10_{cyl}$), with additional details relating to the circulation of gas through the irradiation chamber. Shown explicitly are gas inlet port(s) 40a and gas outlet port(s) 40b. Gas venting layers 150 (shown in heavier solid lines) are provided along surfaces of the NEU layers, and radially extending gas venting channels 155 provide gas communication paths between gas venting layers 150 and the inlet and outlet ports.

Additional ways to increase the circulation of the carrier gas in the irradiation chamber include providing apertures in bulkheads and other structural elements. For embodiments using NEU in tubes, the tube walls can be provided with holes that are generally smaller than the smallest expected size of the NEU granules.

A pump 160 exhausts the gases from irradiation chamber 15 and the gases are subjected to the scavenging and iodine recovery operations described above. The irradiation chamber is preferably maintained at a slight negative pressure during operation.

As discussed above, some of the iodine and gaseous fission products can remain trapped in the uranium matrix, and are recovered in connection with the recovery of Mo-99 and other materials after the NEU is removed from the irradiation chamber. Providing the NEU in a granular form tends to increase the amount of iodine and fission gases that can escape from the uranium matrix during irradiation and be recovered on a continuous basis.

REFERENCES

The following references are incorporated by reference.

techniques for producing medical isotopes. Embodiments of the present invention can be characterized by one or more of the following attributes, alone or in any combination:

- Using neutron-reflecting material maximizes the neutron population above the fast fission threshold of U-238 within the NEU layer or layers, enhancing the fast fission process in the NEU material.
- Maintaining the neutron energy above ~1 MeV while in the NEU minimizes neutron capture, and hence the decay to Pu-239.
- U-238 can be used as a primary fissionable material rather than enriched U-235, which is used by traditional nuclear-reactor-based methods. Depleted uranium, a byproduct from the enrichment process that is already stored at the Department of Energy (DOE) sites, can be utilized efficiently. This greatly reduces the cost of Mo-99/Tc-99m production and I-131 production due the more relaxed regulatory requirements concerning natural uranium or depleted uranium.
- The radioisotope generator according to embodiments of the present invention can be widely deployed, thereby allowing radioisotope generation closer to the end users for use as diagnostic, therapeutic, and research medical radioisotopes in imaging centers, hospitals, and medical research institutions.
- Embodiments of the present invention eliminate or reduce the need to export HEU to foreign nuclear reactors and subsequently import radioisotopes such as Mo-99/Tc-99m and radioactive iodine isotopes.
- A suite of radioactive iodine radioisotopes is produced.
- The integrated iodine dose from all the iodine radioisotopes produced is larger than systems producing only I-131.
- Because some of the iodine radioisotopes have much shorter half-lives than I-131, the produced radioisotope iodine potentially has a broader applicability than I-131 alone—lower dose.

| | |
|---|---|
| Burger_2004 | L. L. Burger, R. D. Scheele, "HWVP Iodine Trap Evaluation," Pacific Northwest National Laboratory Report PNNL-14860 (September 2004) |
| Chapman_2010 | Karena W. Chapman, Peter J. Chupas, and Tina M. Nenoff, "Radioactive Iodine Capture in Silver-Containing Mordenites through Nanoscale Silver Iodide Formation," J. Am. Chem. Soc., 2010, 132 (26), pp 8897-8899 (publication date (web) Jun. 15, 2010) DOI: 10.1021/ja103110y |
| NRC_2009 | Medical Isotope Production without Highly Enriched Uranium, Nuclear and Radiation Studies Board, Division of Earth and Life Studies, National Research Council of the National Academies, The National Academies Press, Washington, D.C. (2009). Dissolution and Mo-99 Recovery are discussed at pages 25-30. http://www.nap.edu/openbook.php?record_id=12569 |
| Pemberton_2008 | Wendy J. Pemberton, Kenneth R. Czerwinski, David Hatchett, "Solubility and Electrochemistry of Uranyl Carbonate in a Room Temperature Ionic Liquid System," presented Sep. 25, 2008 in the Radiochemistry in the Advanced Nuclear Fuel Cycle session of the 42nd Western Regional Meeting of the American Chemical Society, Las Vegas, NV (Sep. 23-27, 2008) |
| Pemberton_2009 | Wendy J. Pemberton, Kenneth R. Czerwinski and David H Hatchett, "Solubility and Electrochemistry of Uranium Extracted into a Room Temperature Ionic Liquid," Actinides 2009, San Francisco, CA, July 2009 |
| Wang_2006. | Wei-Hsung Wang, Kenneth L. Matthews, II, "Simulating Gaseous $^{131}$I Distribution in a Silver Zeolite Cartridge Using Sodium Iodide Solution," Health Physics: May 2006 - Volume 90 - Issue 5 - pp S73-S79 DOI: 10.1097/01.HP.0000203812.30182.7b |

CONCLUSION AND POTENTIAL ADVANTAGES

In conclusion it can be seen that embodiments of the present invention can provide safe, efficient, economical While the above is a complete description of specific embodiments of the invention, the above description should not be taken as limiting the scope of the invention as defined by the claims.

What is claimed is:

1. A method for producing radioactive iodine comprising:
   providing a volume of non-enriched uranium ("NEU") material in an irradiation chamber, the irradiation chamber having a gas inlet port and a gas outlet port;
   providing one or more non-moderating neutron-reflecting regions disposed in the irradiation chamber;
   irradiating the uranium material with neutrons provided by a compact, stand-alone neutron generator to cause fission reactions to occur in the uranium material, wherein:
      the neutrons are provided at an energy above a fast fission threshold for U-238,
      the one or more non-moderating neutron-reflecting regions are configured to increase the path length traveled by at least some of the neutrons before those neutrons leave the irradiation chamber,
      at least some of the fission reactions lead to the production of radioactive iodine, and
      at least some of the radioactive iodine sublimates in the irradiation chamber;
   during irradiation, introducing a carrier gas into the gas inlet port to mix with the sublimated radioactive iodine and form a gas mixture;
   withdrawing the gas mixture from the gas outlet port; and
   separating at least some of the radioactive iodine from other components of the gas mixture.

2. The method of claim 1 wherein at least a portion of the gas mixture is returned to the gas inlet port after separation of the radioactive iodine.

3. The method of claim 1 wherein separating at least some of the radioactive iodine includes using a silver zeolite trap.

4. The method of claim 1, and further comprising, after an irradiation period:
   removing the NEU material from the irradiation chamber;
   dissolving the NEU material in a solvent, thereby releasing additional sublimated iodine as part of an additional gas mixture; and
   separating at least some of the additional radioactive iodine from other components of the additional gas mixture.

5. The method of claim 1 wherein the NEU material consists of one of the following forms: solid material, crushed solid material, metallic shavings, metallic filings, sintered pellets, liquid solutions, molten salts, molten alloys, and slurries.

6. The method of claim 1 wherein the NEU material comprises material in granular form.

7. The method of claim 1 wherein the NEU material comprises material in molten form.

8. The method of claim 1 wherein the NEU material comprises material in solid form.

9. The method of claim 1 wherein the NEU material comprises material formed into multiple elongate rods.

10. The method of claim 1 wherein the compact, stand-alone neutron generator generates neutrons above an energy of 0.8 MeV.

11. The method of claim 1 wherein the one or more non-moderating neutron-reflecting regions disposed in the irradiation chamber comprise multiple elongated parallel non-moderating neutron-reflecting regions disposed within the irradiation chamber, wherein each of the multiple elongated parallel non-moderating neutron-reflecting regions has an interior bore for receiving the NEU material.

12. The method of claim 1 wherein the at least one non-moderating neutron-reflecting region disposed within the irradiation chamber comprises multiple non-moderating neutron-reflecting regions.

13. The method of claim 1 wherein the NEU material comprises depleted uranium.

14. The method of claim 1 wherein the compact, stand-alone neutron generator comprises a linear accelerator-type neutron generator.

15. The method of claim 12 wherein the at least one non-moderating neutron-reflecting region disposed within the irradiation chamber further comprises a non-moderating neutron-reflecting wall interior to the irradiation chamber that is exterior to the multiple non-moderating neutron-reflecting regions.

\* \* \* \* \*